United States Patent
Kim et al.

(10) Patent No.: US 10,320,285 B2
(45) Date of Patent: Jun. 11, 2019

(54) ONE CYCLE CONTROLLED POWER FACTOR CORRECTION CIRCUIT

(71) Applicant: SEMICONDUCTOR COMPONENTS INDUSTRIES, LLC, Phoenix, AZ (US)

(72) Inventors: Jintae Kim, Sungnam-si (KR); Sangcheol Moon, Bucheon (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/037,267

(22) Filed: Jul. 17, 2018

(65) Prior Publication Data

US 2019/0044435 A1 Feb. 7, 2019

Related U.S. Application Data

(60) Provisional application No. 62/540,175, filed on Aug. 2, 2017.

(51) Int. Cl.
*H02M 1/42* (2007.01)
*H02M 1/00* (2006.01)

(52) U.S. Cl.
CPC .. *H02M 1/4225* (2013.01); *H02M 2001/0009* (2013.01); *H02M 2001/0025* (2013.01)

(58) Field of Classification Search
CPC .................................................. H02M 1/4225
See application file for complete search history.

(56) References Cited

U.S. PATENT DOCUMENTS

| 10,103,618 B2* | 10/2018 | Kim .................... H02M 1/42 |
| 2015/0117074 A1* | 4/2015 | Miao .................. H02M 1/4225 363/44 |
| 2016/0248323 A1* | 8/2016 | Gritti .................. H02M 1/4225 |

* cited by examiner

*Primary Examiner* — Fred E Finch, III
*Assistant Examiner* — Ishrat F Jamali
(74) *Attorney, Agent, or Firm* — AMPACC Law Group, PLLC (57) ABSTRACT

A control circuit for controlling a Switch-Mode Power Supply (SMPS) includes a current conduction duration determining circuit, an integrator circuit, a feedback circuit, a sawtooth generator circuit, and a gate control circuit. The current conduction duration determining circuit produces a duration signal according to a duration of a current of the SMPS. The integrator circuit produces an integrator output corresponding to an integral over time of a magnitude of the current. The feedback circuit produces a comparison voltage according to an output voltage of the SMPS. The sawtooth generator circuit produces a sawtooth signal using the comparison voltage and duration signal, such as by dividing the comparison voltage by the duration signal. The gate control circuit generates a gate signal for controlling a power switch of the SMPS according to a comparison of the sawtooth signal to the integrator output. The SMPS may be a Power Factor Correction circuit.

20 Claims, 6 Drawing Sheets

ONE CYCLE CONTROLLED POWER FACTOR CORRECTION CIRCUIT

CROSS-REFERENCES TO RELATED APPLICATIONS

This application claims the benefit of U.S. Provisional Application No. 62/540,175, filed Aug. 2, 2017, which is incorporated by reference in its entirety.

FIELD OF THE DISCLOSURE

The present disclosure relates generally to electronic circuits, and more particularly to electronic circuits such as Switched Mode Power Supplies (SMPS) that may be used to provide Power Factor Correction (PFC) for a load.

BACKGROUND

When a load on an Alternating Current (AC) power source is not a linear load (i.e., the load is a non-linear load) the current being drawn from the AC power source may be out of phase with the voltage of the AC power source. A purely resistive load is a linear load. A load having an energy storage component (such as an inductance or a capacitance) may be a non-linear load. A load that draws power irregularly over the course of a cycle of the AC power source, such as a rectifier or a Switch Mode Power Supply (SMPS), may be a non-linear load.

When the current being drawn by a non-linear load from the AC power source is out of phase with the voltage of the AC power source, the current being drawn from the AC power source will be higher, on average, than it would be if the current and voltage were in phase. This can cause power to be wasted and damage to occur in the AC power source.

The degree to which the current drawn by a load from the AC power source is in phase with the voltage of the AC power source may be expressed as the Power Factor (PF) of the load. An ideal linear load has a PF of 1, and non-linear loads have a PF less than one.

A PFC circuit may be provided between an AC power source and a load. The PFC circuit operates to present a PF close to 1 (e.g., 0.98) to the AC power source by keeping the phase of current drawn from the AC power source close to the phase of the voltage of the AC power supply, even when the phase of the current drawn by the load is out of phase or irregular.

It is desirable for a PFC circuit to minimize line current distortion, that is, deviation of the line current away from proportionality with the line voltage. It is desirable for a PFC circuit to be as simple as possible and still meet its design objectives.

BRIEF DESCRIPTION OF THE FIGURES

In the accompanying figures, like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of the embodiments.

The apparatus and method components have been represented where appropriate by conventional symbols in the drawings, showing only those specific details that are pertinent to understanding the embodiments. This avoids obscuring the disclosure with details that will be readily apparent to those of ordinary skill in the art having the benefit of the disclosures herein. The details of well-known elements, structures, or processes that are necessary to practice the embodiments and that are well known to those of skill in the art may not be shown and should be assumed present unless otherwise indicated.

DETAILED DESCRIPTION

Embodiments relate to electronics, and more particularly to a Switched Mode Power supply (SMPS), such as a Power Factor Correction (PFC) circuit.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

In an embodiment, a control circuit comprises a current conduction duration determining circuit (which may be referred to herein as a duration determining circuit), an integrator circuit, a feedback circuit, a divider circuit, an oscillator circuit, and a gate control circuit. The current conduction duration determining circuit receives a zero crossing detection signal and produces a duration signal using the zero crossing detection signal. The integrator circuit receives a current sense signal and produces an integrator output corresponding to an integral over a measurement period of the current sense signal. The feedback circuit receives a feedback signal and produces a comparison signal corresponding to a difference between the feedback signal and a reference voltage. The divider circuit produces a sawtooth control signal corresponding to a result of dividing the comparison signal by the current duration signal. The oscillator circuit produces a sawtooth signal according to the comparison signal and the sawtooth control signal. The gate control circuit produces a reset signal by asserting the reset signal in response to a value of the integrator output being greater than or equal to a value of the sawtooth signal, and produces a gate signal by de-asserting the gate signal in response to the assertion of the reset signal.

Embodiments reduce line current distortion caused by a SMPS, such as an average-current mode controlled PFC circuit, which might otherwise suffer such distortion because of the limited bandwidth of the current feedback loop, which in a typical PFC circuit of the related art may be only $\frac{1}{6}^{th}$ to $\frac{1}{10}^{th}$ of the switching frequency of the PFC circuit. Embodiments also reduce the complexity of such PFC circuits by not requiring two or more complex math components (such as a multiplier and a divider).

A SMPS, for example, a PFC circuit, may operate by repeated cycles of charging and discharging an inductor. Each operational cycle includes a charging period during which a current in the inductor is transferring energy from a power source into the inductor, and a discharging period during which the current in the inductor is transferring energy from the inductor to a load.

When the charging and discharging periods of the operational cycle make up the entirety of the operational cycle, the PFC circuit is operating in either a Continuous Conduction Mode (CCM) or a Boundary Conduction Mode (BCM). In both CCM and BCM, the charging period of each cycle is immediately followed by the discharging period of that cycle, and the discharging period of an operational cycle is immediately followed by the charging period of the next operational cycle.

CCM and BCM may be distinguished in that in CCM the current in the inductor never drops to zero during the operational cycle, while in BCM the current drops to zero at the end of the discharge period of each operational cycle, and then immediately resumes when the charging period of the subsequent operational cycle begins. BCM may be said to operate at the boundary between CCM and Discontinuous Conduction Mode (DCM).

Discontinuous Conduction Mode (DCM) occurs when the operational cycle may include a substantial period during which the inductor is neither being charged or discharged, during which the net inductor current (excluding ringing caused by interaction between the inductor and other reactive elements of the circuit) is zero. Thus, in a PFC circuit operating in DCM, each operational cycle includes a charging period, a discharging period, and a zero current period.

Figure 1:
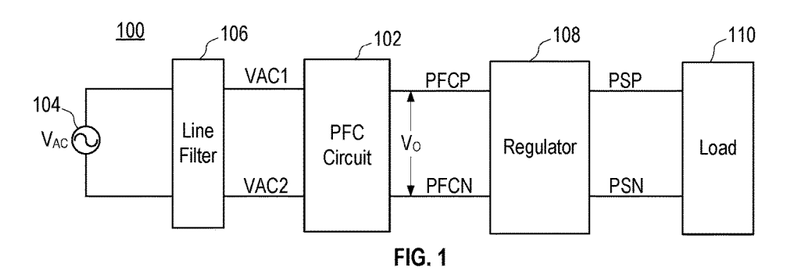
FIG. 1 illustrates an electrical system including a Power Factor Correction (PFC) circuit according to an embodiment.

FIG. 1 illustrates an electrical apparatus 100 including a Power Factor Correction (PFC) circuit 102 according to an embodiment. The electrical apparatus 100 also includes an AC power supply 104, a line filter 106 (also known as an Electro-Magnetic Interference (EMI) filter), a regulator 108, and a load 110.

The AC power supply 104 supplies current to the PFC circuit 102 through the line filter 106. The current is an Alternating Current (AC). In an illustrative embodiment, the AC power supply has a Root-Mean-Square (RMS) voltage between 90 and 240 volts.

The line filter 106 may be a low-pass filter that operates to suppress the propagation of high-frequency signals (for example, frequencies above 9 KHz) from the PFC circuit 102 to the AC power supply 104. The line filter 106 may include one or more inductors, chokes, and capacitors. The line filter 106 outputs first and second AC voltages VAC1 and VAC2.

The PFC circuit 102 converts the power received through the first and second AC signals VAC1 and VAC2 into Direct Current (DC) power and delivers the power through positive and negative PFC output signals PFCP and PFCN. In an illustrative embodiment, a voltage difference between the positive and negative PFC output signals PFCP and PFCN is substantially greater than a peak voltage of the AC power supply. For example, when the PFC circuit 102 is designed to operate with AC power sources ranging from 90 to 240 volts, the voltage difference between the positive and negative PFC output signals PFCP and PFCN (i.e., the output voltage $V_O$ of the PFC circuit 102) may be 400 volts.

The regulator 108 produces positive and negative power supply voltages PSP and PSN using the power delivered from the PFC circuit 102. An example regulator 108 may be a Switch Mode Power Supply (SMPS) that converts the 400V power supplied by the PFC circuit to 12 volts. The regulator 108 delivers power to the load 110 through the positive and negative power supply voltages PSP and PSN.

Figure 2A:
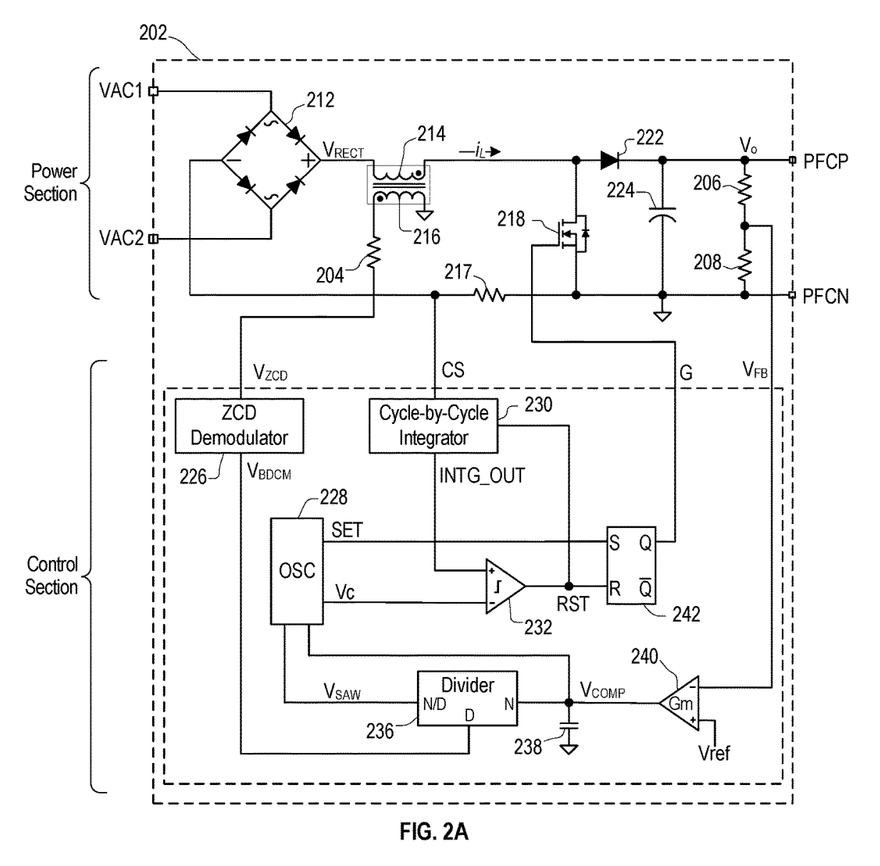
FIG. 2A illustrates a PFC circuit according to an embodiment.

FIG. 2A illustrates a PFC circuit 202 according to an embodiment. The PFC circuit 202 is suitable for use in the PFC circuit 102 of FIG. 1. The PFC circuit 202 receives AC power over first and second AC power signals VAC1 and VAC2 and provides DC power on positive and negative PFC output signals PFCP and PFCN.

The PFC circuit 202 uses one-cycle average-current-mode control. "One-cycle average-current-mode control" refers to controlling a duty cycle of the PFC circuit so that an average of a sensed current during one switching period or switching cycle of the PFC circuit is equal to a control reference, such as by ending a charging period of the switching cycle when the average current is equal to the control reference. In an embodiment, the control reference may depend on the present magnitude of a power supply voltage being supplied to the PFC circuit. The average current may be determined by integrating the sensed current over a period of time equal to one switching cycle.

Figure 2B:
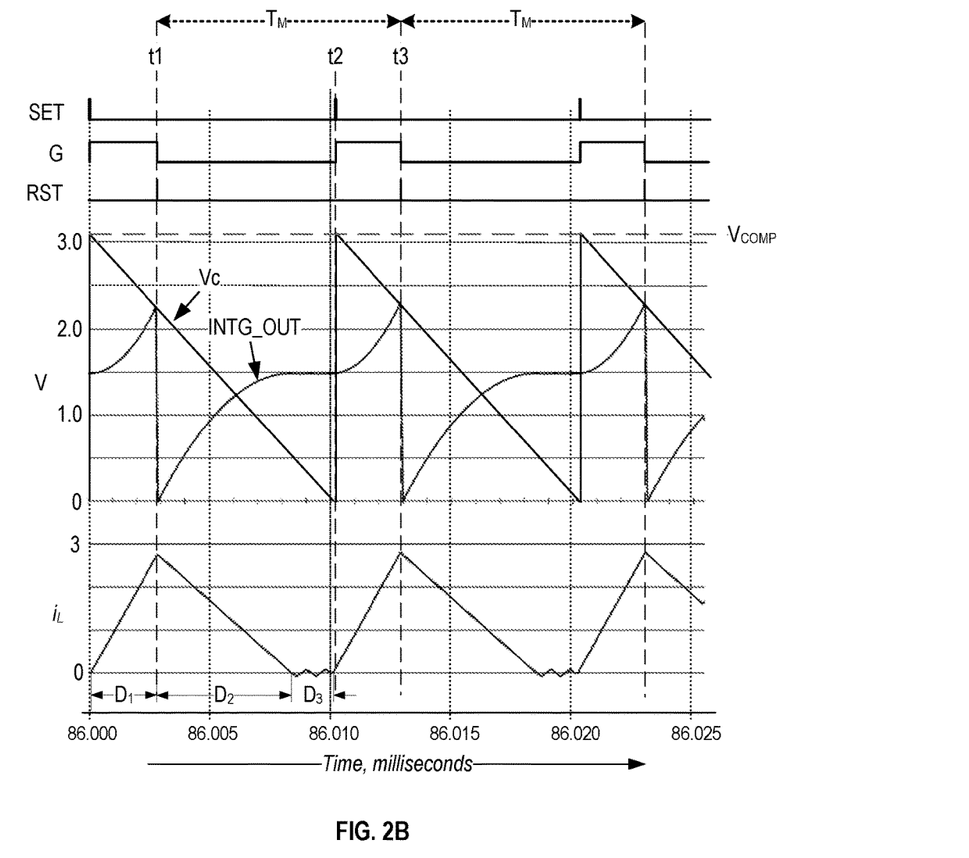
FIG. 2B includes waveforms illustrating operation of the PFC circuit of FIG. 2A.

The basic equation of a one-cycle average-current-mode controlled PFC circuit employing DCM compensation, that is, compensation for the effect of discontinuous current flow on the average current, is:

$$\langle i_L \rangle \cdot R_{CS} = \left(1 - \frac{D_1}{1 - D_3}\right) \cdot ((V_O - V_T) \times k) \qquad \text{Equation 1}$$

wherein $\langle i_L \rangle$ is the average current through the inductor, $R_{CS}$ is a resistance of a current sense resistor, $D_1$ is the charging duty cycle (i.e., the portion of the cycle when power switch 218 of FIG. 2A is on), $D_3$ is the zero-current duty cycle (which is 0 in CCM and BCM, and between 0 and 1 in DCM), $V_O$ is the output voltage, $V_T$ is a target output voltage, and k is a gain of the voltage feedback loop. The charging duty cycle $D_1$, zero-current duty cycle $D_3$, and a discharge duty cycle $D_2$ (i.e., the portion of the cycle when the diode 222 of FIG. 2A is conducting) are illustrated in FIG. 2B.

For the embodiment shown in FIG. 2A that uses a voltage divider to feedback the output voltage $V_O$, Equation 1 becomes:

$$\langle i_L \rangle \cdot R_{CS} = \left(1 - \frac{D_1}{1 - D_3}\right) \cdot \left(\left(\frac{V_O \cdot R_{208}}{R_{206} + R_{208}} - V_{REF}\right) \times k\right) \qquad \text{Equation 1B}$$

wherein $R_{206}$ is a resistance of the first divider resistor 206, $R_{208}$ is a resistance of the second divider resistor 208, and the reference voltage $V_{REF}$ corresponds to $V_T \cdot R_{208}/(R_{208}+R_{206})$.

Because $1-D_3$ is equal to $D_1+D_2$, and the comparison voltage $V_{COMP}$ in FIG. 2A corresponds to $((V_O-V_T) \times k)$, Equation 1 or Equation 1B can be restated as:

$$\langle i_L \rangle \cdot R_{CS} = \left(1 - \frac{D_1}{D_1 + D_2}\right) \cdot V_{COMP} \quad \text{Equation 2}$$
$$= V_{COMP} - \frac{D_1}{D_1 + D_2} \cdot V_{COMP}$$

In the embodiment of FIG. 2A, the target output voltage $V_T$ corresponds to a reference voltage $V_{REF}$ multiplied by a divide-down coefficient of a voltage divider formed by first and second resistors 206 and 208, and the voltage feedback loop gain k may correspond to the gain of the error amplifier 240.

The PFC circuit 202 includes circuitry to generate a sawtooth signal Vc that serves as a reference for what the sensed integrated current should be at each point in time during which the power switch 218 is charging the inductor 214, in order to achieve a target average current. During times when the power switch 218 is on, the sawtooth signal Vc has a value equal to:

$$Vc(t) = V_{COMP} - \frac{1}{C} \cdot I_{SAW} \cdot \Delta t \quad \text{Equation 3}$$
$$= V_{COMP} - \frac{V_{COMP}}{D_1 + D_2} \cdot \frac{\Delta t}{C}$$

wherein C is a capacitance of a capacitor used to determine the sawtooth signal Vc, $I_{SAW}$ is a current determined by scaling the comparison voltage $V_{COMP}$ by the inverse of the portion of the cycle during which current is flowing in the inductor ($I_{SAW}=V_{COMP}/(D_1+D_2)$), and $\Delta t$ is a total time since the power switch 218 was last turned on. If the power switch 218 is turned off at a time when the sawtooth signal Vc is equal to the integral over time of the current through the inductor since the last time the power switch 218 was turned off (i.e., to the integrator output INTG_OUT), the integral current for the current cycle will be equal to a reference target value corresponding to a value of the comparison voltage $V_{COMP}$. For example, in an embodiment, the integral current in each cycle may be equal to a value of the sawtooth signal Vc calculated using a ratio of the comparison voltage Vcomp and the current conduction time D1+D2.

The PFC circuit 202 operates as a boost converter that may produce an output voltage $V_O$ that is DC and that has a magnitude greater than the peak voltage of the AC power that the PFC circuit 202 receives. For example, in an embodiment, the PFC circuit 202 is operable to receive AC power in the range of 90 to 240 volts RMS (having peak voltages in the range of 125 to 340 volts), and to produce 400 V DC power from the AC power. However, embodiments are not limited to boost converters.

The PFC circuit 202 comprises a power section and a control section. The power section of the PFC circuit 202 includes a full-wave bridge rectifier 212, an inductor 214, a sense coil 216, a zero crossing sense resistor 204, a current sense resistor 217, a power switch 218, a diode 222, an output capacitor 224, and a voltage divider comprising a first divider resistor 206 and a second divider resistor 208. In the illustrative embodiment shown, the power switch 218 is a transistor, for example, an n-channel Metal Oxide Semiconductor Field Effect Transistor (nMOSFET).

The control section of the PFC circuit 202 comprises a Zero Crossing Duration (ZCD) demodulator circuit 226, an oscillator circuit 228, a cycle-by-cycle integrator circuit 230 (hereinafter, integrator 230), a comparator 232, a divider circuit 236, a capacitor 238, an error amplifier 240, and a switch control set-reset flip-flop 242 (hereinafter, SRFF 242).

In the power section, the bridge rectifier 212 rectifies the AC power to provide a pulsating DC voltage. In the embodiment shown, the positive output of the bridge rectifier 212 is coupled to a first terminal of the inductor 214, and a negative terminal of the bridge rectifier 212 is coupled, through the current sense resistor 217, to a ground and the negative PFC output signal PFCN.

The inductor 214 is used as an energy storage device. The inductor 214 is inductively coupled to the current sense coil 216, so that a current flowing in the inductor 214 generates a corresponding sense current in the sense coil 216. In an illustrative embodiment, the inductor 214 has an inductance of 200 µHenry (µH) and comprises 30 to 40 turns of wire wound on a ferrite core, and the sense coil 216 comprises 3 to 5 turns of wire wound on the same ferrite core.

The power switch 218 is coupled between a second terminal of the inductor 214 and the ground, and is controlled by a gate signal G. The power switch 218 controls the charging and discharging of the inductor 214.

When the power switch 218 is turned on, a current can flow from the positive terminal of the bridge rectifier 212 through the inductor 214, power switch 218, and current sense resistor 217 and back to the negative terminal of the bridge rectifier 212, charging the inductor 214. When the power switch 218 is turned off, current flowing through the inductor 214 may flow through the diode 222 into the output capacitor 224, thereby discharging the inductor 214 and performing one or both of charging the output capacitor 224 and providing current to a load connected between the positive and negative PFC output signals PFCP and PFCN. A current sense signal CS generated at a terminal of the current sense resistor 217 has a voltage value proportional to the current flowing through the inductor 214.

The diode 222 operates to allow the inductor 214 to charge the output capacitor 224 and to prevent a backward flow of current from the output capacitor 224 to the inductor 214. The output capacitor 224 stores energy for supplying the output voltage $V_O$ to a load via the positive and negative PFC output signals PFCP and PFCN.

A first terminal of the current sense coil 216 is coupled to ground. A second terminal of the current sense coil 216 provides a zero crossing detection voltage $V_{ZCD}$ to the ZCD circuit 226 of the control section through the zero crossing sense resistor 204. In an embodiment, the zero crossing sense resistor 204 operates to limit a voltage of the zero crossing detection voltage $V_{ZCD}$ by limiting a current from the current sense coil 216.

The first and second divider resistors 206 and 208 produce a feedback voltage $V_{FB}$ proportional to the output voltage $V_O$. A value of the feedback voltage $V_{FB}$ is equal to $V_O \cdot R_{208}/(R_{206}+R_{208})$, where $R_{206}$ is a resistance of the first divider resistor 206 and 8208 is a resistance of the second divider resistor 208.

The control section generates the gate signal G according to the ZCD voltage $V_{ZCD}$, the current sense signal CS, and the feedback voltage $V_{FB}$ received from the power section.

In an embodiment, the control section is embodied in an integrated circuit. In an embodiment, the integrated circuit including the control section also include components of the power section, such as, for example, the power switch 218.

The error amplifier 240 generates a comparison voltage $V_{COMP}$ proportional to a difference between a reference voltage Vref and the feedback voltage $V_{FB}$. The filter capacitor 238 operates to low-pass filter the comparison voltage $V_{COMP}$, to prevent ripple in the output voltage $V_O$ from creating instability in the control section. The ZCD demodulator circuit 226 is a duration determining circuit that produces, using the zero crossing detection voltage $V_{ZCD}$, a current duration voltage $V_{BDCM}$ indicating a duration of current flowing in the inductor 214 during a cycle time of the PFC circuit 202 (i.e., the value of $V_{BDCM}$ corresponds to $T_1+T_2$, as shown in FIG. 4B, below).

The divider circuit 236 generates, using the comparison voltage $V_{COMP}$ and the current duration voltage $V_{BDCM}$, a sawtooth control signal $V_{SAW}$ corresponding to a result of dividing a value of the comparison voltage $V_{COMP}$ by a value of the current duration voltage $V_{BDCM}$. The sawtooth control signal $V_{SAW}$ is used by the oscillator 228 to determine a slope of a sawtooth signal SAW.

The oscillator 228 generates a set signal SET and the sawtooth signal Vc. Assertion of the set signal SET causes the SRFF 242 to assert the gate signal G, thereby indicating that the power switch 218 is to be turned on.

When the set signal SET is asserted, the sawtooth signal Vc has a value determined according to the comparison voltage $V_{COMP}$. In an embodiment, the sawtooth signal Vc may be set to that value when the gate signal G is de-asserted.

In another embodiment, the sawtooth signal Vc may be set to the value determined according to the comparison voltage $V_{COMP}$ in response to the SET signal being asserted.

In another embodiment, the sawtooth signal Vc may be set to the value determined according to the comparison voltage $V_{COMP}$ in response to the GATE signal being asserted. For example, when the gate signal is asserted by driving the gate signal high, the sawtooth signal Vc may be set to the value determined according to the comparison voltage $V_{COMP}$ in response to a rising edge of the gate signal.

During the period of time that the gate signal G is asserted, the sawtooth signal Vc decreases a rate determined according to a value of the sawtooth controls signal $V_{SAW}$.

The comparator 232 compares the sawtooth signal $V_{SAW}$ to an integrator output INTG_OUT to generate a reset signal RST. When a value of the integrator output INTG_OUT is greater than a value of the sawtooth signal $V_{SAW}$, the reset signal is asserted, indicating that the power switch 218 is to be turned off and that the integrator output INTG_OUT is to be reset to 0.

The integrator 230 generates the integrator output INTG_OUT according to the reset signal RST and the current sense signal CS. When the reset signal RST is asserted, the integrator 230 resets the integrator output INTG_OUT to a reset value, such as 0. When the reset signal RST is not asserted, the integrator 230 outputs a value of the integrator output INTG_OUT corresponding to the integral over time of values of the current sense signal CS in the time interval since the de-assertion of the reset signal RST.

FIG. 2B includes waveforms illustrating operation of the PFC circuit 202 of FIG. 2A. FIG. 2B illustrates the set signal SET, the gate signal G, the reset signal RST, the inductor current $i_L$ through the inductor 214, the sawtooth signal Vc, the integrator output INTG_OUT, a value of the comparison voltage $V_{COMP}$, and a measurement cycle time $T_M$.

In the embodiment of FIG. 2A, at a first time t1, the integrator output INTG_OUT becomes greater than or equal to the (decreasing) sawtooth signal Vc. In response, the comparator 232 asserts the reset signal RST. The assertion of the reset signal RST signals the end of a charging period of the inductor 214, and causes the integrator 230 to reset the integrator output INTG_OUT to zero. Accordingly, the integrator output INTG_OUT corresponds to an integral, starting at the end of the previous charging period (which is the beginning of the most recent discharge period), of the current flowing from the inductor 214.

The sawtooth signal Vc decreases at a rate determined by the sawtooth control signal $V_{SAW}$, and at any point in time during $D_1$ corresponds to an integrated current from the inductor, beginning at the end of the last charging period for the inductor, that would correspond to a target average current through the inductor 214 for a measurement cycle. As the time since the end of the last charging period increases, the value of the sawtooth signal Vc decreases.

When the integrator output INTG_OUT is equal to the present value of the sawtooth signal SAW at the first time t1, the average current through the inductor 214 has reached the target average current, and charging of the inductor 214 can cease for the currently-measured measurement cycle. Accordingly, the SRFF 242 de-asserts the gate signal, bringing the current charging period of the inductor 214 to an end and beginning the next discharge period, and the integrator 230 resets to 0 to prepare for integrating the current for the next measurement cycle.

At a second time t2, the oscillator 228 asserts the set signal SET, causing a new charging period to begin. Note that the average current is the average across the measurement cycle time $T_M$, which goes from the beginning of a discharge period of the inductor 214 to the beginning of the next discharge period of the inductor 214. As a result, respective charging periods of the inductor 214, initiated by assertions of the set signal SET, occur at the end of measurement cycles.

At a third time t3, the process described at the first time t1 begins again.

As a result, the PFC circuit 202 operates so that the higher the integrated inductor current (which starts being integrated at the beginning of the last discharge period) the faster the power switch 218 turns off.

Figure 3A:
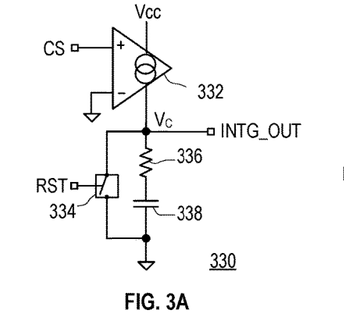
FIG. 3A illustrates a cycle-by-cycle integrator circuit according to an embodiment.

FIG. 3A illustrates an integrator 330 according to an embodiment, suitable for use as the integrator 230 of FIG. 2A. The integrator 330 generates an integrator output INTG_OUT corresponding to an integral over time of the values of a current sense signal CS, and includes a voltage to current converter circuit (I2VC) 332, a switch 334, a resistor 336, and a capacitor 338.

In response to the assertion of a reset signal RST, the switch 334 is turned on and discharges the capacitor 338. When the reset signal is de-asserted, the I2VC 332 charges the capacitor at a rate proportional to the value of the current sense signal CS, which may correspond to a current through an inductor (such as the inductor 214 of FIG. 2A). The resistor 336 operates to limit the current through the capacitor 338.

Figure 3B:
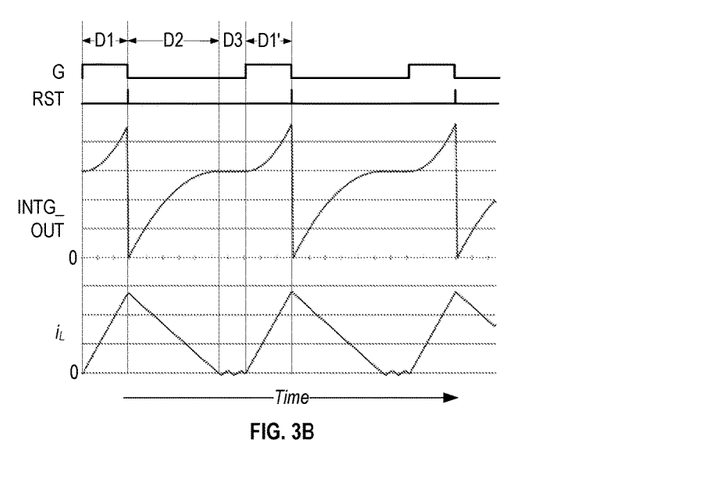
FIG. 3B includes waveforms illustrating operation of the integrator circuit of FIG. 3A.

FIG. 3B includes waveforms illustrating operations of the integrator 330. The assertion of the reset signal RST corresponds to the end of a charging period D1 of the inductor and the beginning of a discharge period D2 of the inductor. The integrator output INTG_OUT is reset to 0 at the beginning of the discharge period D2, and then increases at a rate proportional to the value of the current through the inductor (as indicated by the current sense signal CS) throughout the discharge period D2, a zero-current period D3, and a subsequent charging period D1'. At the end of the subsequent charging period D1', the reset signal RST is asserted again and the integrator output INTG_OUT is reset to 0 again.

Figure 4A:
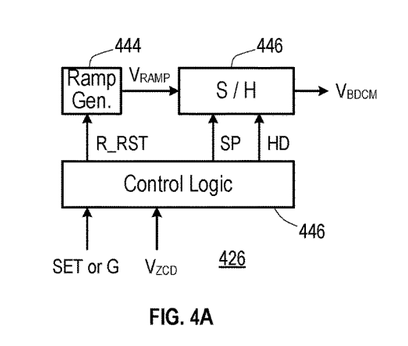
FIG. 4A illustrates a Zero Crossing Duration demodulator circuit according to an embodiment.
Figure 4B:
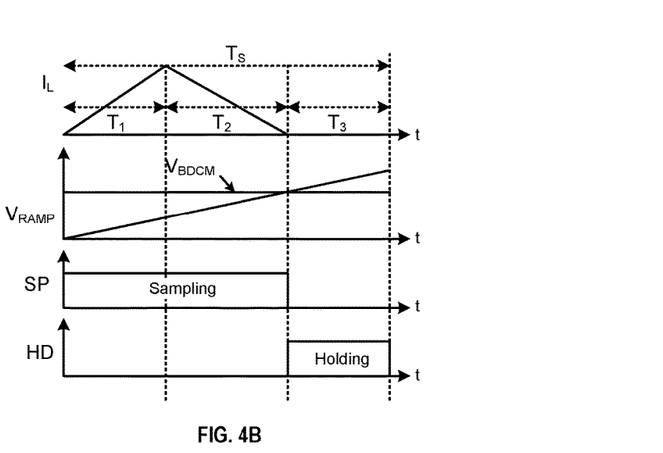
FIG. 4B includes waveforms illustrating operation of the Zero Crossing Duration demodulator circuit of FIG. 4A.

FIG. 4A illustrates a Zero Crossing Duration (ZCD) demodulator circuit 426 according to an embodiment, suitable for use in the ZCD demodulator circuit 226 of FIG. 2A. The ZCD demodulator circuit 426 includes control logic 446, a ramp generator circuit 444, and a sample-and-hold (S/H) circuit 446.

The control logic 446 generates a ramp reset signal R_RST, a sampling signal SP, and a hold signal HD using the zero crossing detection voltage $V_{ZCD}$ and the set signal SET or gate signal G. When the gate signal G is asserted, or when the set signal SET indicates that the gate signal G is to be asserted, the control logic 446 asserts the sampling signal SP and de-asserts the hold signal HD. When the zero crossing detection voltage $V_{ZCD}$ indicates current is not flowing in the inductor 214, such as by being less than the pre-determined zero current detect threshold value, the control logic 446 de-asserts the sampling signal SP and asserts the hold signal HD.

When the sampling signal SP is asserted, the S/H circuit 446 tracks the value of the ramp voltage $V_{RAMP}$ on an internal node. When the sampling signal SP is de-asserted, the S/H circuit 446 stops tracking the ramp voltage $V_{RAMP}$ and holds the last tracked value on the internal node. In response to the assertion of the hold signal HD, the S/H circuit 446 sets the current duration voltage $V_{BDCM}$ to the value held on the internal node and holds the current duration voltage $V_{BDCM}$ at that value until the next assertion of the hold signal HD.

In response to or simultaneously with asserting the sampling signal SP, the control logic 446 outputs a pulse on the ramp reset signal R_RST, which causes the ramp generator circuit 444 to reset the value of the ramp voltage $V_{RAMP}$ to 0. After the reset, the value of the ramp voltage $V_{RAMP}$ rises at a predetermined rate.

FIG. 4B includes waveforms illustrating operation of the Zero Crossing Duration demodulator circuit 426 of FIG. 4A, including the inductor current $I_L$, the ramp voltage $V_{RAMP}$, the sampling signal SP, and the hold signal HD. A switching cycle time $T_S$ corresponds to a duration of a switching cycle, a first portion time $T_1$ corresponds to a duration of the power switch 218 of FIG. 2A being turned on (corresponding to $D_1$ of FIG. 2B), a second portion time $T_2$ corresponds to a diode conduction time of the diode 222 of FIG. 2A (corresponding to $D_2$ of FIG. 2B), and a third portion time $T_3$ corresponds to a zero-current time of the inductor 214 of FIG. 2A (corresponding to $D_3$ of FIG. 2B).

Accordingly, the Zero Crossing Duration demodulator circuit 426 produces the current duration voltage $V_{BDCM}$ having a value proportional to the sum of the first and second portion times $T_1$ and $T_2$, that is, proportional to the duration, within each cycle, that current is flowing in the inductor 214.

Figure 5A:
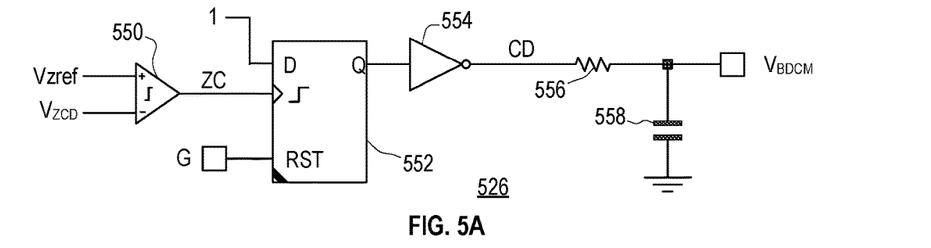
FIG. 5A illustrates a Zero Crossing Duration demodulator circuit according to another embodiment.

FIG. 5A illustrates a ZCD demodulator circuit 526 according to another embodiment, suitable for use in the ZCD demodulator circuit 226 of FIG. 2A. The ZCD demodulator circuit 526 includes a comparator 550, a D-type flip flop (DFF) 552, an inverter 554, a resistor 556, and a capacitor 558, and produces a current duration voltage $V_{BDCM}$ according to a zero crossing detection voltage $V_{ZCD}$, a predetermined zero current reference voltage Vzref, and a gate signal G.

The resistor 556 and the capacitor 558 form a low-pass resistor-capacitor (RC) filter that acts as an averaging circuit. A time constant of the low-pass RC filter (e.g., the product of a resistance of the resistor 556 and a capacitance of the capacitor 558) is substantially greater than the switching cycle time $T_S$ of the gate signal G. For example, in an embodiment wherein the switching cycle time $T_S$ is between 5 and 15 microseconds, the time constant of the low-pass RC filter may be 300 microseconds or more.

Figure 5B:
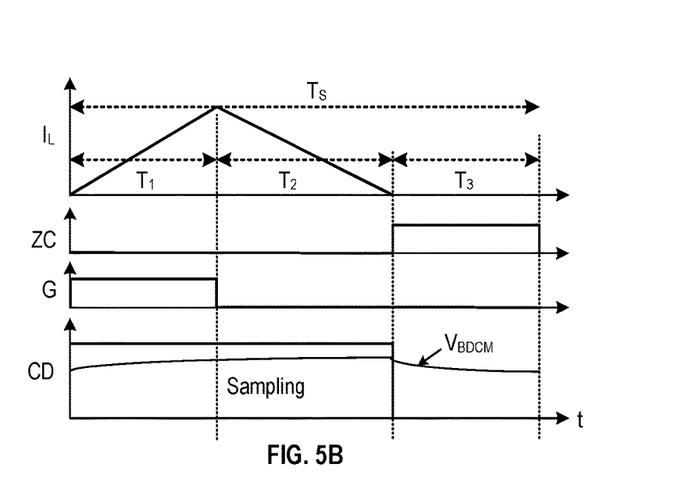
FIG. 5B includes waveforms illustrating operation of the Zero Crossing Duration demodulator circuit of FIG. 5A.

FIG. 5B includes waveforms illustrating operation of the ZCD demodulator circuit 526 of FIG. 5A, including the inductor current $I_L$, a Zero Current signal ZC, the gate signal G, and a charge-discharge (CD) signal CD. Times $T_S$, $T_1$, $T_2$, and $T_3$ are as described for FIG. 4B, above.

During the first period time $T_1$, the gate signal G is asserted and the inductor 214 of FIG. 2A is being charged. The gate signal G resets the DFF 552 so that its Q output is de-asserted, which causes the inverter 554 to assert the CD signal CD. The assertion of the CD signal CD causes the capacitor 558 to charge through the resistor 556, increasing the value of the current duration voltage $V_{BDCM}$.

During the second period time $T_2$, the gate signal G is de-asserted and the inductor 214 of FIG. 2A is discharging. The Q output of the DFF 552 remains de-asserted, causing the inverter 554 to continue to assert the CD signal CD. The assertion of the CD signal CD causes the capacitor 558 to charge through the resistor 556, further increasing the value of the current duration voltage $V_{BDCM}$.

During the first and second period times $T_1$ and $T_2$, the zero crossing detection voltage $V_{ZCD}$ corresponding to the coil current $I_L$ is greater than the zero crossing reference voltage Vzref, and as a result the comparator 550 de-asserts the Zero Current signal ZC. At the end of the second period time $T_2$, the inductor 214 is completely discharged, the zero crossing detection voltage $V_{ZCD}$ drops below the zero current reference voltage Vzref, and the comparator 550 asserts the Zero Current signal ZC.

In response to the assertion of the Zero Current signal ZC, the DFF 552 asserts its Q output, which causes the inverter 554 to de-assert the CD signal CD. The de-assertion of the CD signal CD causes the capacitor 558 to discharge through the resistor 556, decreasing the value of the current duration voltage $V_{BDCM}$. The CD signal CD remains de-asserted until the next assertion of the gate signal G.

Accordingly, an average value of the current duration voltage $V_{BDCM}$ corresponds to the duration of the portion of the switching cycle time $T_S$ during which current is flowing in the inductor 214.

Figure 6A:
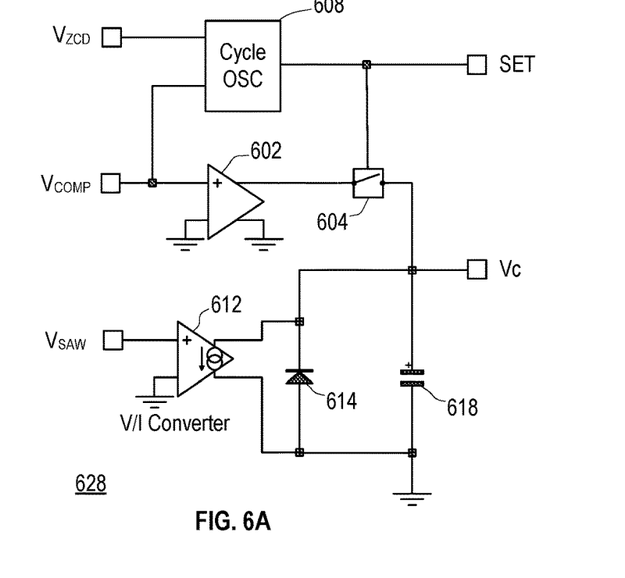
FIG. 6A illustrates an oscillator circuit according to an embodiment.

FIG. 6A illustrates an oscillator circuit 628 according to an embodiment, suitable for use as the oscillator 228 of FIG. 2A and for producing a set signal SET and a sawtooth signal Vc according to the comparison voltage $V_{COMP}$ and the sawtooth control signal $V_{SAW}$. The oscillator circuit 628 includes an amplifier 602, a switch 604, a cycle oscillator 608, a voltage-to-current (V2I) converter 612, a diode 614, and a capacitor 618.

Figure 6B:
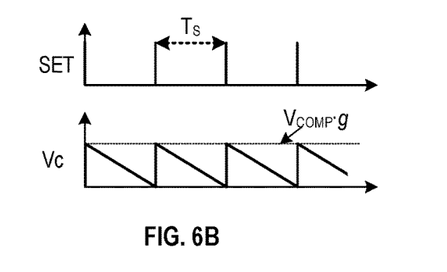
FIG. 6B includes waveforms illustrating operation of the oscillator circuit of FIG. 6A.

FIG. 6B includes waveforms illustrating operation of the oscillator circuit 628 of FIG. 6A, and includes the set signal SET and the sawtooth signal Vc. Also shown in FIG. 6B are the switching cycle time $T_S$ and a value corresponding to a value of the comparison voltage $V_{COMP}$ multiplied by the gain g of the amplifier 602.

The cycle oscillator 608 asserts the set signal SET at a frequency corresponding to the switching frequency of the PFC circuit 202, that is, at intervals corresponding to the switching cycle time $T_S$. The assertion of the set signal SET may be performed by generating a pulse on the set signal SET. In some embodiments, the frequency of assertion of the set signal SET may vary according to the comparison voltage $V_{COMP}$. In some embodiments, the assertion of the set signal SET may be synchronized to an indication on the zero crossing detection voltage $V_{ZCD}$ that no current is flowing in the inductor 214, that a magnitude of a ring voltage is below a predetermined threshold, or both.

The amplifier 602 produces an output having a voltage value equal to a product of the gain g of the amplifier 602 and a value of the comparison voltage $V_{COMP}$. The output of the amplifier 602 is provided through the switch 604 when the set signal SET is asserted. As a result, the capacitor 618 is charged to the value $g \times V_{COMP}$ when the set signal SET is asserted.

When the set signal SET is de-asserted, the V2I converter 612 discharges the capacitor 618 by sinking a current determined according to the value of the sawtooth control signal $V_{SAW}$. Higher values of the sawtooth control signal $V_{SAW}$ correspond to a higher current being sunk, and therefore to a faster discharging of the capacitor 618. The diode 614 acts as a negative voltage clamp to limit the voltage across the capacitor 618 to be no more negative than the forward voltage drop of the diode 614.

As a result, the oscillator 608 produces the set signal SET having periodic pulses, and the sawtooth signal Vc that is reset to a value determined by the comparison voltage $V_{COMP}$ by the pulses on the set signal SET and that decreases from that value at a rate determined by the sawtooth control signal $V_{SAW}$ in the interval between those pulses, as shown in FIG. 6B.

Figure 7:
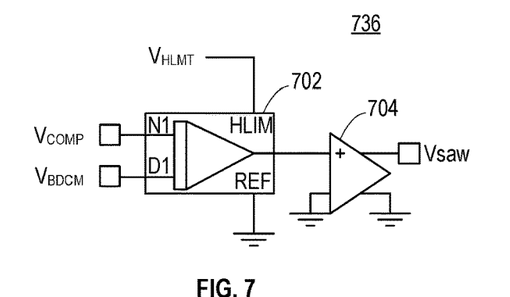
FIG. 7 illustrates a divider circuit according to an embodiment.

FIG. 7 illustrates a divider circuit 736 according to an embodiment, suitable for use in the divider 236 of FIG. 2A. The divider circuit 736 includes an analog divider subcircuit 702 and an amplifier 704, and produces the sawtooth control signal $V_{SAW}$ having a value corresponding to a value of the comparison voltage $V_{COMP}$ divided by a value of the current duration voltage $V_{BDCM}$.

The analog divider subcircuit 702 produces a value corresponding to a value of the comparison voltage $V_{COMP}$ divided by a value of the current duration voltage $V_{BDCM}$, in a range from the value on the reference voltage input REF to a value of a high limit voltage input HLIM. In the embodiment shown, the high limit voltage HLIM is supplied with a predetermined high limit voltage $V_{HLMT}$ and the reference voltage input REF is tied to ground.

The amplifier 704 buffers the output of the analog divider subcircuit 702. Circuits for implementing each of the analog divider subcircuit 702 and the amplifier 704 are known in the related art.

Figure 8:
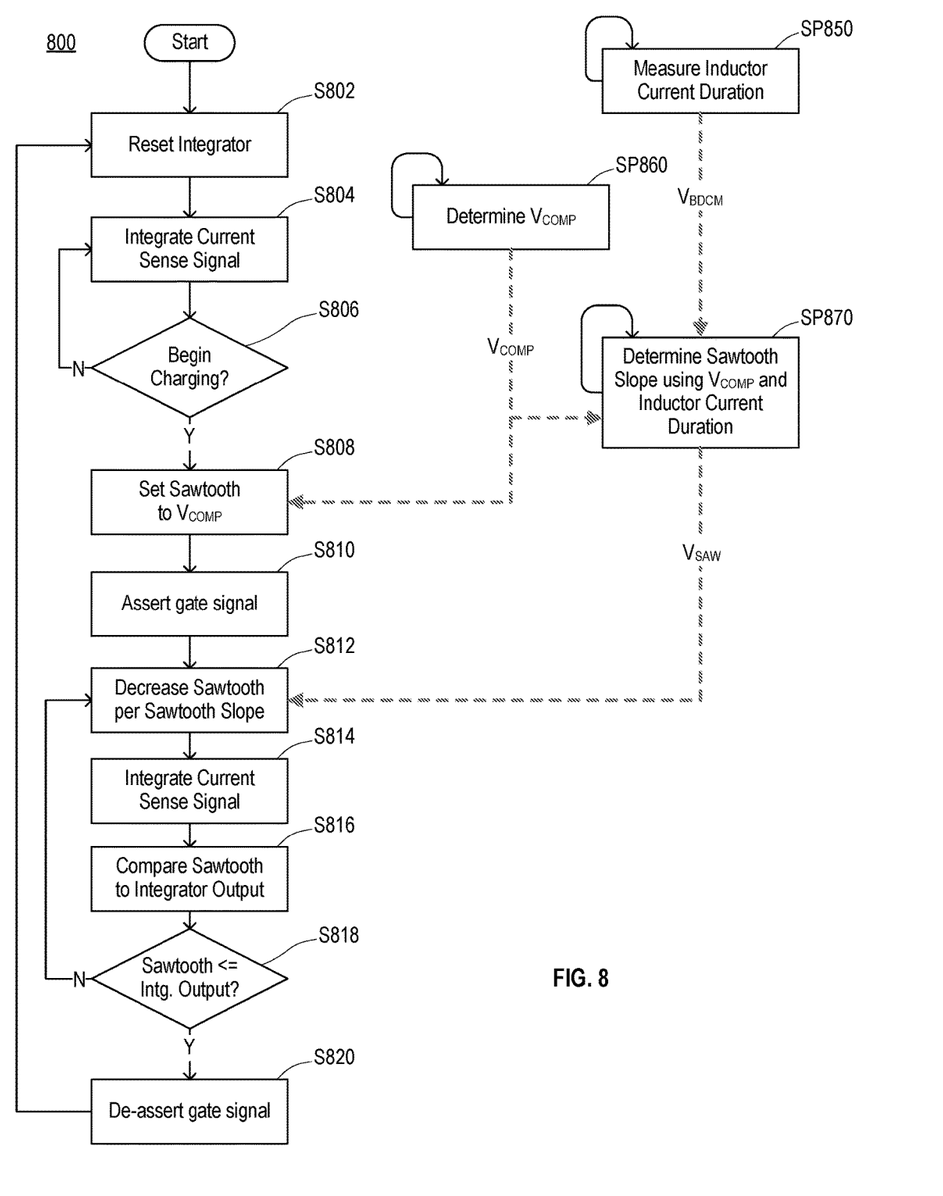
FIG. 8 illustrates a process for controlling a Power Factor Correction circuit, according to an embodiment.

FIG. 8 illustrates a process 800 for operating a SMPS controller circuit (such as the controller section of the PFC circuit 202 of FIG. 2A), according to an embodiment. The process 800 includes a first sub-process SP850, a second sub-process SP860, and a third sub-process SP870, each of which provides information (indicated by dashed arrows) for use in the process 800 or another sub-process thereof.

The sub-process SP850 produces a current duration voltage $V_{BDCM}$ according to a duration of an inductor current. The sub-process SP850 may do so using a zero-current detection signal.

The sub-process SP860 produces a comparison voltage $V_{COMP}$ according to a difference between an output voltage and a target voltage for the output voltage.

The sub-process SP870 produces a sawtooth control signal $V_{SAW}$ for controlling a rate of decrease (that is, a sawtooth slope) of a sawtooth signal. The Sub-process 870 may produce the sawtooth control signal $V_{SAW}$ according to a division of the comparison voltage $V_{COMP}$ by the current duration voltage $V_{BDCM}$ ($V_{COMP} \div V_{BDCM}$). As a result, a time for the sawtooth signal to decrease from the value of the comparison voltage $V_{COMP}$ to zero may be made proportional to the duration of current flowing in the inductor in each cycle.

Turning to the process 800, at S802, an integrator circuit configured to produce an integrator output corresponding to an integral over time of a measurement corresponding to a present value of a current flowing in an inductor resets the integrator output to 0.

At S804, the integrator circuit integrates a value corresponding to the present value of a current flowing in an inductor into the value of the integrator output.

At S806, a determination is made whether to begin charging the inductor. The determination may be made by a process outside the scope of this disclosure. In response to the determination to begin charging the inductor, at S806 the process 800 proceeds to S808; otherwise the process 800 proceeds to S804.

At S808, process 800 sets the sawtooth signal to a value according to the comparison voltage $V_{COMP}$. The sawtooth signal may be set to a value of the comparison voltage $V_{COMP}$ times a predetermined constant.

At S810, the process 800 asserts a gate signal. The assertion of the gate signal causes the inductor to be charged.

At S812, the process 800 decreases a value of the sawtooth signal according to the sawtooth slope indicated by the sawtooth control signal $V_{SAW}$.

At S814, the integrator circuit integrates the value corresponding to the present value of the current flowing in the inductor into the value of the integrator output.

At S816, process 800 compares the value of the sawtooth signal to the value of the integrator output.

At S818, in response to the sawtooth signal being less than or equal to the value of the integrator output, the process 800 proceeds to S820; otherwise the process 800 proceeds to S812.

At S820, the process 800 de-asserts the gate signal. The de-assertion of the gate signal ends the charging of the inductor. In response to the end of the charging of the inductor, the inductor begins discharging. The process 800 then proceeds to S802.

Embodiments of the present disclosure are described with respect to a PFC controller, but embodiments are not limited thereto. Embodiments may be employed in other forms of Switched-Mode Power Supplies (SMPS), such as DC-to-DC converters.

Embodiments of the present disclosure include electronic devices configured to perform one or more of the operations described herein. However, embodiments are not limited thereto.

While illustrative embodiments have been disclosed to aid in the understanding of the disclosure, embodiments are not limited thereto, but are instead limited only by the scope of the appended claims. Embodiment may include various modifications and equivalent arrangements included within the scope of the appended claims. The order of operations described in embodiments is illustrative and may be re-ordered unless otherwise constrained. Further, features of two or more embodiments may be combined to form a new embodiment.

What is claimed is:

1. A control circuit comprising:
   a duration determining circuit to receive a zero crossing detection signal and produce a duration signal using the zero crossing detection signal;

an integrator circuit to receive a current sense signal and produce an integrator output corresponding to an integral over a measurement period of the current sense signal;

a feedback circuit to receive a feedback signal and produce a comparison signal corresponding to a difference between the feedback signal and a reference voltage;

a divider circuit to produce a sawtooth control signal corresponding to a result of dividing the comparison signal by the duration signal;

an oscillator circuit to produce a sawtooth signal according to the comparison signal and the sawtooth control signal; and a gate control circuit to produce a reset signal by asserting the reset signal in response to a value of the integrator output being greater than or equal to a value of the sawtooth signal, and to produce a gate signal by de-asserting the gate signal in response to the assertion of the reset signal.

2. The control circuit of claim 1, wherein the control circuit is for controlling a Power Factor Correction (PFC) circuit, wherein: the PFC circuit produces the zero crossing detection signal and current sense signal according to a current through an inductor; the PFC circuit controls the current through the inductor using the gate signal; and the PFC circuit produces the feedback signal according to an output voltage of the PFC circuit.

3. The control circuit of claim 1, wherein the integrator circuit comprises:
a capacitor having a first terminal coupled to a ground and a second terminal coupled to the integrator output;
a switch coupled across the capacitor and configures to discharge the capacitor in response to the assertion of the reset signal; and
a voltage-to-current converter coupled to the second terminal of the capacitor to provide a current to the capacitor according to a value of the current sense signal.

4. The control circuit of claim 1, wherein the duration determining circuit comprises:
a ramp generator circuit to reset a ramp voltage in response to an indication that the gate signal is asserted and to increase the ramp voltage at a predetermined rate thereafter; and
a sample-and-hold circuit to sample the ramp voltage when the zero crossing detection signal indicates that a current is flowing and to hold and output a previously-sampled value of the ramp voltage when the zero crossing detection signal indicates that the current is not flowing.

5. The control circuit of claim 1, wherein the duration determining circuit comprises:
a zero current detection circuit to receive the zero current detection signal and a zero current reference voltage, and to produce a zero current signal by asserting the zero current signal when the zero current detection signal is less than the zero current reference voltage;
an edge-triggered flip-flop circuit to generate a charge-discharge signal by asserting the charge-discharge signal when the gate signal is asserted and de-asserting the charge-discharge signal in response to an assertion of the zero current signal; and
a low-pass filter to generate the duration signal by averaging a value of the charge-discharge signal.

6. The control circuit of claim 1, wherein the oscillator circuit comprises:

a switch circuit to couple the sawtooth signal to the comparison signal in response to an assertion of a set signal;
a capacitor having a first terminal coupled to the sawtooth signal and a second terminal coupled to a ground; and
a voltage-to-current converter coupled across the capacitor to generate a current for discharging the capacitor at a rate corresponding to a value of the sawtooth control signal,
wherein the assertion of the set signal corresponds to an assertion of the gate signal.

7. A control circuit for controlling a Switch-Mode Power Supply (SMPS), the control circuit comprising:
a current conduction duration determining circuit to produce a duration signal according to a duration of a current of the SMPS;
an integrator circuit to produce an integrator output corresponding to an integral over time of a magnitude of the current of the SMPS;
a feedback circuit to produce a comparison voltage according to an output voltage of the SMPS;
a sawtooth generator circuit to produce a sawtooth signal according to the comparison voltage and the duration signal; and
a gate control circuit to generate a gate signal for controlling a power switch of the SMPS according to a comparison of the sawtooth signal and the integrator output.

8. The control circuit of claim 7, wherein the SMPS includes a Power Factor Correction (PFC) circuit.

9. The control circuit of claim 7, wherein the current conduction duration determining circuit receives a zero crossing detection signal from the SMPS and produces the duration signal having a value corresponding to an elapsed time from an assertion of the gate signal to an occurrence of a zero current indication on the zero crossing detection signal.

10. The control circuit of claim 7, wherein the integrator circuit resets the integrator output in response to a de-assertion of the gate signal.

11. The control circuit of claim 7, wherein the sawtooth generator circuit sets the sawtooth to a value according to the comparison signal in response to an assertion of the gate signal, and subsequently decreases a magnitude of the sawtooth signal at a rate corresponding to a result of dividing the comparison voltage and the duration signal.

12. The control circuit of claim 7, wherein the gate control circuit de-asserts the gate signal in response to the integrator output being equal to or greater than the sawtooth signal.

13. The control circuit of claim 7, wherein the control circuit performs single-cycle average-current-mode control of the SMPS.

14. A method for controlling a Switched Mode Power Supply (SMPS) circuit, the method comprising:
producing, by an integrator circuit, an integrator output corresponding to an integral over the duration of a measurement cycle of a value of a current sense signal, the current sense signal indicating a current of the SMPS circuit;
producing, by a duration determining circuit, a duration signal corresponding to a duration of the current of the SMPS circuit;
producing, by an oscillator circuit according to the duration signal, a sawtooth signal having a plurality of values at a plurality of times within a time period of the measurement cycle, respectively, each value of the sawtooth signal corresponding to a target integrated current value for the respective time, the target integrated current value corresponding to a target average current for the measurement cycle;

determining, by a comparison circuit during the time period of the measurement cycle, a reset signal indicating whether the value of the integrator output is greater than the sawtooth signal; and producing, using the reset signal, a gate signal to control the current of the SMPS circuit.

15. The method of claim 14, further comprising:

producing, using an error circuit, a comparison signal having a value corresponding to a difference between a voltage value of an output of the SMPS circuit and a target output voltage value; and producing, by an oscillator circuit according to the comparison signal and a result of a division of the comparison signal by the duration signal, the sawtooth signal.

16. The method of claim 15, further comprising:

de-asserting the gate signal in response to the reset signal indicating that the integrator output is greater than the sawtooth signal;

setting the sawtooth signal to a value according to the comparison signal in response to an assertion of the gate signal; and decreasing a value of the sawtooth signal at a rate determined according to the result of a division of the comparison signal by the duration signal when the gate signal is asserted.

17. The method of claim 14, wherein the time period of the measurement cycle is a charging period of a device in the SMPS circuit through which the current of the SMPS circuit flows.

18. The method of claim 14, further comprising:

resetting, by the integrator circuit, the integrator output to zero in response to the reset signal indicating that the integrator output is greater than the sawtooth signal.

19. The method of claim 14, further comprising:

producing, by a duration determining circuit, the duration signal using a zero crossing detect signal generated according to the current of the SMPS circuit.

20. The method of claim 14, wherein the SMPS circuit is a Power Factor Correction (PFC) circuit.

* * * * *